July 25, 1939.  E. M. COLE  2,167,023
SIDE DRESSING APPARATUS FOR PLANTERS
Filed Oct. 9, 1936  2 Sheets-Sheet 2
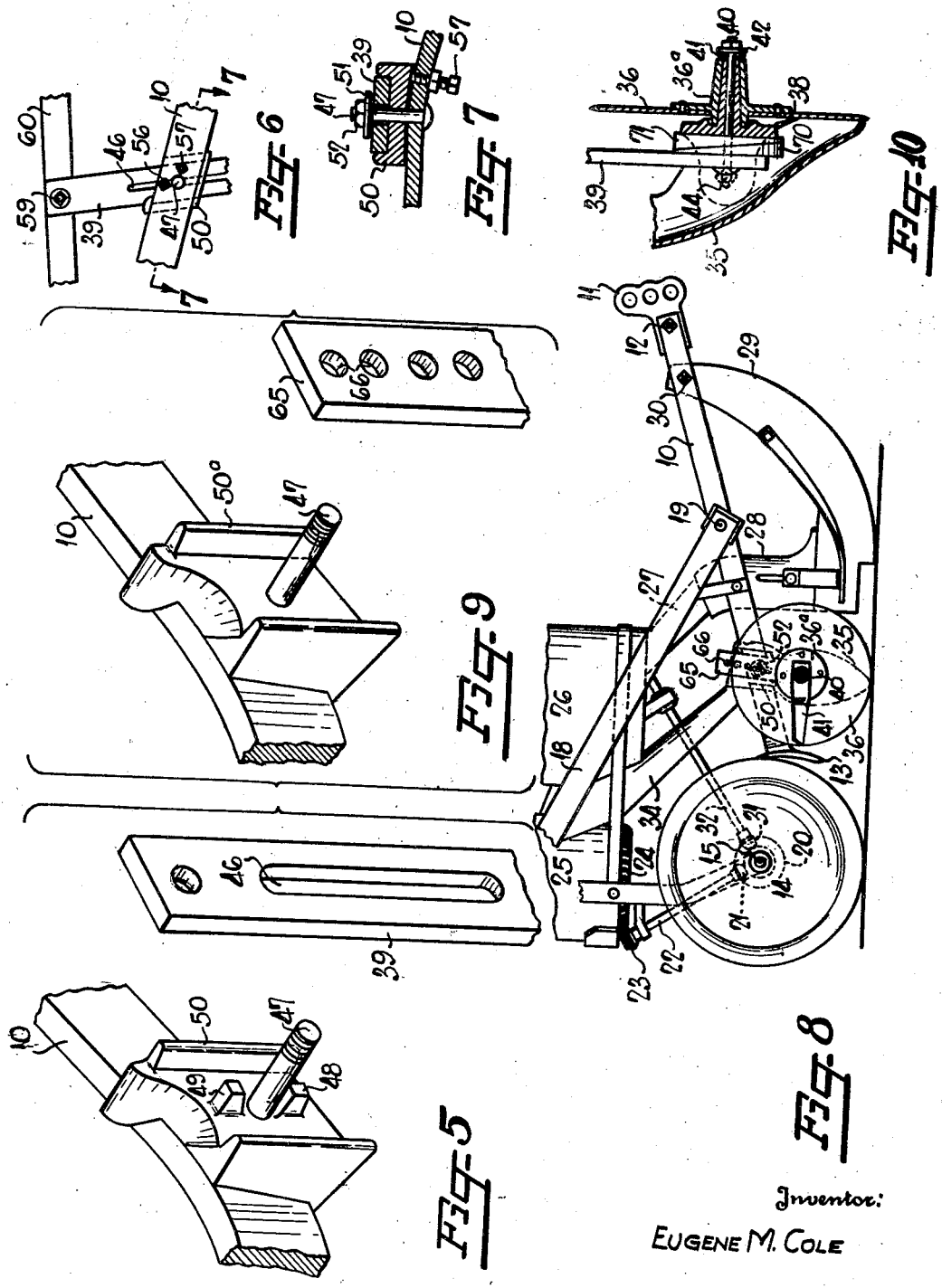
Inventor:
Eugene M. Cole
By Paul S. Eaton
Attorney Patented July 25, 1939

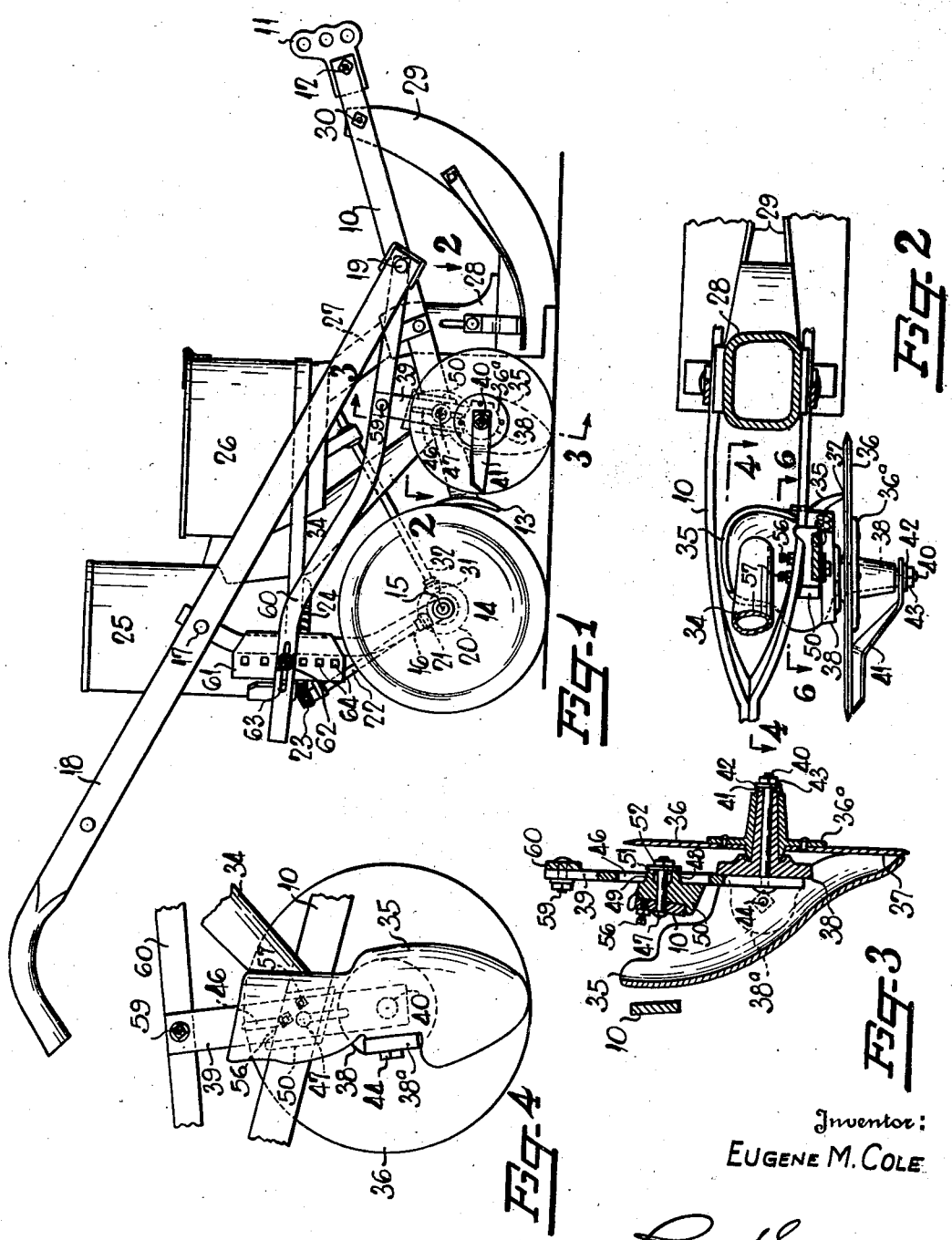

2,167,023

UNITED STATES PATENT OFFICE 2,167,023

SIDE DRESSING APPARATUS FOR PLANTERS

Eugene M. Cole, Charlotte, N. C.

Application October 9, 1936, Serial No. 104,856

2 Claims. (Cl. 111—52)

This invention relates to an attachment for use on seeding machines and fertilizer sowers, and more especially to an attachment which is adapted to apply fertilizer in any desirable relation to the plated seed or the growing plant.

It is therefore, an object of this invention to provide an attachment for use on farm implements for placing of fertilizer either on a level with the seed which are being simultaneously planted or at any reasonable distance above or below the seed and also at any reasonable distance laterally and parallel to the lines of seed. The apparatus is so designed and constructed as not to disturb the soil about the seed and also not to clog and gather vines or trash or otherwise interfere with the normal running operation of the machine to which the invention is attached.

It is a further object of this invention to provide an attachment for placing fertilizer in an off-set, parallel relation to a line of seed which are being simultaneously planted or to a line of growing plants, with positive means for regulating the placement of fertilizer with any reasonable relation to the planted seed or the growing plants. By using this positive regulating means the position at which the fertilizer is placed with relation to the growing plants or the planted seeds may be regulated with certainty and accuracy to accommodate different conditions under which the implement is operated.

It is a further object of this invention to provide an apparatus of the class described, comprising means for directing the fertilizer in an off-set parallel relation to the line of seed which is being simultaneously planted or to a line of growing plants, said means comprising a stationary chute having its lower end thereof normally penetrating the soil into which the fertilizer is directed, said chute normally cooperating with and adjoining one face of a rotary disk for providing a furrow for said fertilizer, and means for adjusting the angularity of said disk and a stationary chute relative to the framework of the implement in order to vary the size or dimensions of the furrow into which the fertilizer is directed.

Some of the objects of the invention having been stated, other objects will appear as the description proceeds, when taken in connection with the accompanying drawings, in which:

Figure 1 is a side elevation of a seed planter showing one form of the invention applied thereto;

Figure 2 is an enlarged sectional plan view taken along line 2—2 in Figure 1;

Figure 3 is a vertical sectional view taken along line 3—3 in Figure 1;

Figure 4 is a detail elevation of a portion of the invention taken along line 4—4 in Figure 2;

Figure 5 is an exploded isometric view showing the means for effecting a vertical adjustment of the attachment relative to the framework of the seeding apparatus;

Figure 6 is a detail elevation taken along line 6—6 in Figure 2;

Figure 7 is a sectional plan detail view taken along line 7—7 in Figure 6;

Figure 8 is a side elevation of the lower portion of a seed planter showing a slightly modified form of the invention applied thereto;

Figure 9 is an exploded isometric view showing the means for attaching the apparatus shown in Figure 8 to the framework of the seed planter;

Figure 10 is a sectional view similar to the lower portion of Figure 3 but showing a different means of adjusting the position of the rotary disk and hoe relative to the framework.

Referring more specifically to the drawings, the numeral 10 indicates the frame of a seed planter which has secured to the forward end thereof a hitch 11 by any suitable means such as a bolt 12. The rear end of the frame 10 has a suitable scraper 13 secured thereto which normally scrapes the excess soil, dirt, mud and the like, from the periphery of the drive wheel 14. The drive wheel 14 rotates about shaft 15 to which is secured upwardly extending supports such as 16. The upper end of these supports have secured thereto as at 17 suitable handles 18, said handles having their lowermost ends secured as at 19 to the framework 10.

The means for driving the mechanism disposed within fertilizer hopper 25 comprises beveled gear 20 which is fixedly mounted on wheel 14. This gear has meshing therewith beveled gear 21 which gear is secured on the lower end of shaft 22, whereas, another gear 23 is secured on the upper end of said shaft. The gear 23 meshes with gear 24 which is rotatably mounted beneath the hopper to discharge the fertilizer.

Supported between handles 18 and above the framework 10, is the conventional fertilizer hopper 25 and a seed nopper 26. Leading from the lower portion of the seed hopper 26 is a spout 27 through which seed is transferred in to a hollow standard 28, down into a suitable furrow. Secured to the lower portion of standard 28 is an arcuate runner 29 which runner has its other end extending upwardly and is secured as at 30 to the framework 10. The seed hopper 26 is driven by any suitable means such as shaft 32. This shaft has beveled gear 31 on its lower end which meshes with gear 20. The upper end of shaft 32 has a similar gear thereon, not shown, which drives the conventional seeding mechanism within the seed hopper.

The fertilizer hopper 25 has leading from the lower portion thereof a spout 34, which spout extends downwardly between the opposed bars of framework 10 and has its outlet at the upper end of a stationary chute or shoe 35, which may be flat but is preferably concave so as to better guide fertilizer into furrow. Thus chute 35 extends downwardly and has the lower end thereof normally projecting beneath the top surface of the soil in order to provide a furrow into which the fertilizer is directed. This shoe is what might be commonly termed as a combination shoe and spout, because the lower forward edge of the shoe serves to provide a furrow, whereas, the hollow, interior, upper portion thereof serves as a spout for guiding the fertilizer into the furrow formed at an off-set line relative to the furrow in which the seed may be simultaneously deposited through the hollow standard 28 (Figure 2).

By observing Figures 2 and 3, it is seen that the lowermost forward edge of the shoe 35 normally contacts a rotary disk 36 as at 37 to scrape the inner surface of this disk at all times and to also cooperate with this disk in providing the desired furrow and holding the furrow open until fertilizer is deposited in the bottom of said furrow.

It is therefore evident that the fertilizer will be deposited at the lowermost junction point of the disk 36 and the shoe 35, which shoe provides a suitable furrow so that the fertilizer will always be placed at the proper depth and also, so that it will be automatically covered after it has been deposited. Therefore, it is very essential that the fertilizer be deposited in the lowermost portion of the furrow while the furrow is being made so that some of the soil on the sides will automatically fall back into the furrow and cover the fertilizer. The fertilizer is also fully covered by the drive-wheel of the planter shown in Figure 1 and by usual covering devices in case of other machines to which my invention may be attached.

The disk 36 is rotatably mounted on the hub of a suitable spindle bracket 38. This bracket is normally secured to a standard 39 by any suitable means such as a bolt 40. The spindle has a scraper 41 secured on the outer end thereof for normally contacting the outer surface of the disk in order to scrape the excess soil or dirt therefrom. Scraper 41, washer 42, and the nut 43 normally confine the hub 36a and attached disk 36 on the spindle bracket 38. The bracket 38 has a projection 38a which extends inwardly toward the longitudinal center line of the planter and has secured thereto, by any suitable means such as bolt 44, the hollow chute or shoe 35.

The standard 39 has a longitudinal slot 46 therein which slot is adapted to slidably fit over bolt 47 and projections 48 and 49 on bracket 50 (Figures 5, 6 and 7). The bolt 47 also penetrates the framework 10 to hold the bracket 50 thereon. A washer 51 is placed on the end of bolt 47 and is adapted to rest upon the projections 48 and 49. Threadably mounted on the end of bolt 47 is a nut 52 confining the washer thereon.

By referring to Figures 3, 5 and 7, it is seen that the projections 48 and 49 are slightly longer than the thickness of the standard 39; consequently, a vertical sliding movement of standard 39 can be effected, since there is sufficient clearance between standard 39 and the bracket 50 and washer 51.

It frequently occurs that it is desired to adjust the disk 36 at an angle relative to the line of travel of the frame 10 of the planter in order to vary the size of the furrows into which the fertilizer is adapted to be placed. Therefore, means have been provided whereby the bracket 50 can be set at any desired angle relative to the line of travel of framework 10 thereby placing the shoe 35 and disk 36 at a corresponding angle. In order to produce this result suitable set screws 56 and 57 have been threadably secured in the framework 10 with their ends normally engaging the interior face of the bracket 50. It is evident that if it is desired to adjust the standard 39 axially about its vertical axis it is necessary to manipulate the set screw 57. Likewise, if it is desired to adjust the position of the standard 39 laterally on the machine, 56 the set screw is manipulated. Any desired angle of adjustment of the standard and the furrow providing means relative to framework 10 can be obtained by operating both of the set screws.

The upper end of standard 39 is pivotally secured as at 59 to a lever or bar 60, said bar 60 having the forward end thereof pivoted as at 19 to framework 10 and having the rear end thereof secured to bracket 61 by any suitable means such as bolt 62. The lever or bar 60 has a slot 63 which is also penetrated by bolt 62. When it is desired to adjust the lower end of the disk 36 and shoe 35 relative to the surface of the soil, it is only necessary to remove the bolt 62 from the slot 63 and replace or readjust the members so that the bolt 62 will be placed in another of a series of holes 64 in bracket 61. This provides a simple and yet a positive means for adjusting the depth at which the fertilizer attachment will operate relative to the framework of the planter and to the planted seed.

Figures 8 and 9 show a slightly modified form of the invention which is identical in all respects to the previously described structure except that a standard 65 is provided with a different method of effecting a vertical adjustment. The standard 65 has a plurality of holes 66 therein which are adapted to be penetrated by the bolts 47. Slot 46 and lever 60 are eliminated and adjustment is obtained by using one of the desired holes 66. Also a slightly different bracket 50a is provided in which projections 48 and 49 are omitted. Since the principal difference is in the means for providing vertical adjustment another description of the parts will not be made but like reference characters will apply to like parts.

In this form of the invention when it is desired to vary the depth of the disk 36 and its cooperating shoe 35, it is necessary to remove the nut 52 from the end of bolt 47 and place the bolt in a different hole 66 in standard 65.

The means for varying the angular adjustment of the disk 36 in the modified form of the invention is the same as shown in Figures 1 to 7.

Figure 10 shows a slightly modified form of adjusting the position of the combination shoe and spout and the disk 36 relative to framework 10. This means comprises two bevelled slotted wedges 70 and 71 which are placed around bolt 40 and clamped between the standard 39 and spindle bracket 38. It is evident that lateral adjustment can be effected by loosening the bolt 40 so that the bevelled washers can be slid to the desired position and again clamping them in position. This adjusting means may be used separately or in combination with the adjusting means shown in the preceding forms.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. A guano distributor having a framework, a furrow opener disposed centrally and forwardly of the framework for depositing seed, a second furrow opener disposed rearwardly of the first furrow opener and also being disposed laterally of the longitudinal center of the framework for depositing guano to one side of the seed deposited in the furrow formed by the first furrow opener, the second furrow opener comprising a standard, a disk mounted for rotation on the lower end of the standard, means for adjusting the angularity of the disk relative to a vertical plane, means for adjusting the position of the lower end of the standard and the disk laterally of the longitudinal center of the framework, and a shoe having open lower and upper ends and being secured to said standard and having its lower open end flush with one side of the disk.

2. A guano distributor having a framework, a furrow opener disposed centrally and forwardly of the framework for depositing seed, a second furrow opener disposed rearwardly of the first furrow opener and also being disposed laterally of the longitudinal center of the framework for depositing guano to one side of the seed deposited in the furrow formed by the first furrow opener, the second furrow opener comprising a standard, a disk mounted for rotation on the lower end of the standard, means for adjusting the angularity of the disk relative to a vertical plane, and a shoe having open lower and upper ends and being secured to said standard and having its lower open end flush with one side of the disk.

EUGENE M. COLE.